United States Patent [19]
Yamada et al.

[11] Patent Number: 5,174,924
[45] Date of Patent: Dec. 29, 1992

[54] PTC CONDUCTIVE POLYMER COMPOSITION CONTAINING CARBON BLACK HAVING LARGE PARTICLE SIZE AND HIGH DBP ABSORPTION

[75] Inventors: Makoto Yamada, Tokyo; Setsuya Isshiki; Yukihiko Kurosawa, both of Chiba, all of Japan

[73] Assignee: Fujikura Ltd., Tokyo, Japan

[21] Appl. No.: 532,712

[22] Filed: Jun. 4, 1990

[51] Int. Cl.⁵ .............................................. H01B 1/06
[52] U.S. Cl. .................................. 252/511; 252/502; 252/510; 524/495; 524/496; 423/445
[58] Field of Search ............... 252/511, 510; 524/495, 524/496; 423/445

[56] References Cited

U.S. PATENT DOCUMENTS

| | | | |
|---|---|---|---|
| 2,978,665 | 4/1961 | Vernet et al. | 338/22 R |
| 3,243,753 | 3/1966 | Kohler | 338/31 |
| 3,760,495 | 9/1973 | Meyer | 252/511 |
| 3,861,029 | 1/1975 | Smith-Johannsen et al. | 29/611 |
| 4,124,747 | 11/1978 | Murer et al. | 252/511 |
| 4,237,441 | 12/1980 | van Konynenburg et al. | 252/511 |
| 4,238,812 | 12/1980 | Middleman et al. | 219/505 |
| 4,255,698 | 3/1981 | Simon | 320/35 |
| 4,315,237 | 2/1982 | Middleman et al. | 338/22 R |
| 4,318,220 | 3/1982 | Diaz | 29/611 |
| 4,329,726 | 5/1982 | Middleman et al. | 361/58 |
| 4,334,148 | 6/1982 | Kampe | 219/553 |
| 4,352,083 | 9/1982 | Middleman et al. | 338/23 |
| 4,388,607 | 6/1983 | Toy et al. | 252/511 |
| 4,400,614 | 8/1983 | Sopory | 219/528 |
| 4,426,339 | 1/1984 | Kamath et al. | 264/22 |
| 4,426,633 | 1/1984 | Taylor | 338/25 |
| 4,500,672 | 2/1985 | Suzuki et al. | 423/445 |
| 4,534,889 | 8/1985 | van Konynenburg et al. | 252/511 |
| 4,545,962 | 10/1985 | Fouts, Jr. et al. | 252/511 |
| 4,560,524 | 12/1985 | Smuckler | 264/105 |
| 4,591,700 | 5/1986 | Sopory | 252/511 |
| 4,689,475 | 8/1987 | Kleiner et al. | 219/553 |
| 4,724,417 | 2/1988 | Au et al. | 338/22 R |
| 4,743,321 | 5/1988 | Soni et al. | 156/85 |
| 4,764,664 | 8/1988 | Kamath et al. | 338/22 R |
| 4,774,024 | 9/1988 | Deep et al. | 252/511 |
| 4,775,778 | 10/1988 | van Konynenburg et al. | 252/511 |
| 4,784,695 | 11/1988 | Mito et al. | 423/445 |
| 4,800,253 | 1/1989 | Kleiner et al. | 219/553 |
| 4,818,439 | 4/1989 | Blackledge et al. | 252/511 |
| 4,845,838 | 7/1989 | Jacobs et al. | 29/671 |
| 4,857,880 | 8/1989 | Au et al. | 338/22 R |
| 4,935,156 | 6/1990 | van Konynenburg et al. | 252/511 |
| 5,059,408 | 10/1991 | Mito | 423/445 |

FOREIGN PATENT DOCUMENTS

| | | |
|---|---|---|
| 2003964 | 5/1990 | Canada . |
| 0038713 | 10/1981 | European Pat. Off. . |
| 0038718 | 10/1981 | European Pat. Off. . |
| 2106920 | 4/1983 | United Kingdom . |

OTHER PUBLICATIONS

Cabot Corp., *Carbon Blacks for Specialty Applications*, Jun. 1988.
Cabot Corp., Carbon Blacks for Rubber Applications, Mar. 1989.
"Electrochemical and Physicochemical Properties" Kinoshita, Lawrence Berkeley Laboratory, Berkeley, CA.

(List continued on next page.)

Primary Examiner—Paul Lieberman
Assistant Examiner—Bradley A. Swope
Attorney, Agent, or Firm—Sughrue, Mion, Zinn, Macpeak & Seas

[57] ABSTRACT

A conductive polymer composition exhibiting positive temperature coefficient behavior comprising:
(a) a crystalline polymer having dispersed therein
(b) carbon black having an average particle diameter of at least about 60 millimicrons and a DBP absorption of at least about 80 cc/100 g.

Circuit protection devices containing a thin layer of this conductive polymer composition between laminar electrodes provide high breakdown voltage in combination with very low resistance and are useful for protecting high-current/high voltage battery-powered devices.

46 Claims, 2 Drawing Sheets

OTHER PUBLICATIONS

"Standard Test Method for Carbon Black—Dibutyl Phthalate Absorption Number", Annual Book of ATSM Standards, vol. 09.01, May, 1988.

"Standards Classification System for Carbon Blacks Used in Rubber Products", Annual Book of ASTM Standards, vol. 09.01, Jun., 1988.

"Electrical Properties of Carbon Black Filled Polyethylene", M. Narkis, A. Ram and F. Flasher, Polymer Engineering and Science, Jun., 1978, vol. 18, No. 8.

"Polyethylene/Carbon Black Switchng Materials", Journal of Applied Polymer Science, vol. 22, 1163–1165 (1978).

"Stability of Polymer Composites as Positive-Temperature-Coefficient Resistor", Polymer Engineering and Science, Oct., 1974, vol. 14, No. 10.

"Glass Transistor Temperature as a Guide to Selection of Polymers Suitable for PTC Materials", Polymer Engineering and Science, Nov., 1973, vol. 13, No. 6.

"The Evaluation of Tracking Resistance of Organic Materials by Several Methods", T. Torii, S. Isshiki, Y. Sekiguchi & H. Nemoto.

PTC CONDUCTIVE POLYMER COMPOSITION CONTAINING CARBON BLACK HAVING LARGE PARTICLE SIZE AND HIGH DBP ABSORPTION

FIELD OF THE INVENTION

The present invention relates to a positive temperature coefficient polymer composition, and to an electrical device containing this composition with high breakdown voltage.

BACKGROUND OF THE INVENTION

Conductive polymer compositions exhibiting positive temperature coefficient (PTC) behavior, and electrical devices containing these compositions, are well-known, as disclosed, for example, in U.S. Pat. Nos. 2,952,761; 2,978,665; 3,243,753; 3,351,882; 3,571,777; 3,697,450; 3,757,086; 3,760,495; 3,793,716; 3,823,217; 3,858,144; 3,861,029; 3,950,604; 4,017,715; 4,072,848; 4,085,286; 4,117,312; 4,124,747; 4,177,376; 4,177,446; 4,188,276; 4,237,441; 4,238,812; 4,242,573; 4,246,468; 4,250,400; 4,252,692; 4,255,698; 4,271,350; 4,272,471; 4,304,987; 4,309,596; 4,309,597; 4,314,230; 4,314,231; 4,315,237; 4,317,027; 4,318,881; 4,318,220; 4,327,351; 4,329,726; 4,330,704; 4,334,148; 4,334,351; 4,352,083; 4,361,799; 4,388,607; 4,398,084; 4,400,614; 4,413,301; 4,425,397; 4,426,339; 4,426,633; 4,427,877; 4,435,639; 4,429,216; 4,442,139; 4,459,473; 4,481,498; 4,476,450; 4,502,929; 4,514,620; 4,517,449; 4,534,889; 4,545,926; 4,591,700; 4,724,417; 4,743,321; 4,764,664; 4,845,838; 4,857,880; German OLS No. 1,634,999; German OLS No. 2,746,602; German OLS No. 2,821,799; European Application No. 38,718; European Application No. 38,718; European Application No. 38,713; European Application No. 38,714; UK Application No. 2,076,106A; European Application No. 63,440; European Application No. 74,281; European Application No. 92,406; European Application No. 119,807; European Application No. 84,304,502.2; European Application No. 84,305,584.7; European Application No. 84,307,984.9; UK Patent Nos. 1,470,502 and 1,470,503; Klason and Kubat, *J. Applied Polymer Science*, 19, 831–845 (1975); J. Meyer, *Polymer Engineering and Science*, vol. 13 No. 6, 462–468 (1973); J. Meyer, *Polymer Engineering and Science*, vol. 14, No. 10, 706–716 (1974); M. Narkis, *Polymer Engineering and Science*, vol. 18, No. 8, 649–653 (1978); and M. Narkis, *J. Applied Polymer Science*, vol. 25, 1515–1518 (1980). The disclosure of each of the patents, publications and applications referred to above is incorporated herein by reference. In particular, J. Meyer, M. Narkis and U.S. Pat. No. 4,237,441 disclose conductive polymer compositions containing various conventional carbon blacks and their PTC behaviors.

It is known that polymers, including crystalline polymers, can be made electrically conductive by dispersing therein suitable amounts of finely divided conductive fillers. Some conductive polymers exhibit what is known as PTC (positive temperature coefficient) behavior. As used herein, the terms "PTC polymer," "composition exhibiting PTC behavior" and "PTC composition" are used to denote a composition which has an $R_{14}$ value of at least 2.5 and an $R_{100}$ value of at least 10, and preferably has an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. A plot of the log of the resistance of a PTC element (i.e., an element composed of a PTC composition) against temperature will often show a sharp change in slope over a part of the temperature range in which the composition has an $R_{100}$ value of at least 10. The term "switching temperature" (abbreviated herein to $T_s$) is used herein to denote the temperature at the intersection point of extensions of the substantially straight portions of such a plot which lie either side of the portion showing the sharp change in slope. The term "peak resistivity" is used herein to denote the maximum resistivity which the composition exhibits above $T_s$, and the term "peak temperature" is used to denote the temperature at which the composition has its peak resistivity. This relationship is illustrated in FIG. 6, where A indicates resistivity at 25° C., B is the average slope of the curve and C indicates maximum resistivity.

It is well known that PTC behavior of conductive polymer compositions depends on the physical and chemical properties of the polymer and carbon black which are mixed and dispersed. Recently, the demand for circuit protection devices having a high breakdown voltage has increased for use in electrical devices consuming large amounts of electric power. In many applications, the circuit protection device should withstand a high power supply voltage when the circuit is in a fault state, that is, when the circuit protection device has been tripped to its high resistance state. It is understood that the composition should be an insulator at the tripped temperature, and that the conductive polymer composition should exhibit PTC behavior.

A circuit protection device has a relatively low resistance under normal conditions, but under fault conditions it converts to high resistance, i.e., is "tripped" above the switching temperature of the PTC polymer to reduce the current flow through the device and the circuit it protects and thereby protect the circuit. Recent electrical or electronic devices and apparatuses powered by a battery supplying a large amount of power have relatively low resistance, sometimes, very low resistance. Particularly, the use of devices having very low resistance has rapidly increased with development of electrical and electronic technology, and therefore the demand for protection circuit devices having very low resistance, e.g., at most about 500 mΩ, but able to withstand high power supply voltages has remarkably increased.

In circuit protection devices, the requirement of very low resistance in normal operation requires that the contact resistance between electrodes of the circuit protection device and the PTC polymer in contact with the electrodes be reduced, and that the PTC polymer layer between the electrodes itself be made as thin as possible. However, very thin conventional PTC polymer elements with low resistance are usable only at relatively low power supply voltages because, in general, the breakdown voltage of the device decreases as the thickness of the polymer layer or the resistivity of the polymer material (and hence the resistance of the device) is decreased. As defined herein, the term "breakdown voltage" is the maximum power supply voltage, increasing at a steady rate of 60 V/min, which can be applied across the PTC polymer element without causing dielectric breakdown of the PTC polymer composition.

High breakdown voltage is often required since a relatively high power supply voltage is needed to drive devices such as a motor. However, although a conventional circuit protection device containing a low resistivity conductive polymer composition allows more current to pass through, often these devices cannot simultaneously withstand a high voltage.

Two-step irradiation cross-linking and heating between the two crosslinking steps are disclosed in U.S. Pat. Nos. 4,857,880 and 4,724,417 to maintain PTC behavior after frequent or long tripping and high voltage. However, this requires at least three processes and is complicated and expensive.

Conventional PTC conductive polymer compositions containing various types of carbon blacks do not have remarkably high breakdown voltage. However, we have discovered that a composition comprising certain carbon blacks has a remarkably high breakdown voltage despite having very low resistance and excellent PTC behavior.

SUMMARY OF THE INVENTION

One object of the present invention is to provide a PTC polymer composition having simultaneously low volume resistivity and high breakdown voltage.

A further object of the invention is to provide a circuit protection device with a high breakdown voltage.

Another object of the invention is to provide a circuit protection device with a high breakdown voltage and low resistance.

A still further object of this invention is to provide improved circuit protection devices which comprise an element composed of a PTC material and which are capable of carrying relatively high currents even when they are of small size.

A further object of the invention is to provide a method for preparing a PTC polymer composition having a low volume resistivity and high breakdown voltage.

It has now been discovered that these and other objects of the present invention are attained by a novel conductive polymer composition composed of a dispersion of a carbon black having a large particle diameter and a high DBP (Dibutyl Phthalate) absorption, in a crystalline polymer. More particularly, in one aspect the invention relates to a conductive polymer composition exhibiting positive temperature coefficient behavior comprising:

(a) a crystalline polymer having dispersed therein
(b) carbon black having an average particle diameter of at least about 60 millimicrons and a DBP absorption of at least about 80 cc/100 g.

The invention further includes a process for preparing a shaped article of a conductive polymer composition as defined above, which process comprises (1) providing:
(a) a crystalline polymer component, and
(b) a carbon black having an average particle size of at least 60 millimicrons and a DBP absorption of at least about 80 cc/100 g;
(2) preparing a composition which comprises a dispersion of said carbon black in said polymer component by a process which comprises dispersing said carbon black in said polymer component while said polymer component is molten;
(3) melt-shaping the composition to form a sheet; and
(4) thermally annealing the sheet under pressure.

In another aspect the invention includes an electrical device which comprises a PTC element composed of a conductive polymer composition as defined above and at least two electrodes which can be connected to a source of electrical power to cause current flow through the PTC element.

BRIEF DESCRIPTION OF THE DRAWINGS

The invention is illustrated in the accompanying drawings, in which.

DESCRIPTION OF THE PREFERRED EMBODIMENTS

I. Composition

A. Carbon Black

Figure 1:
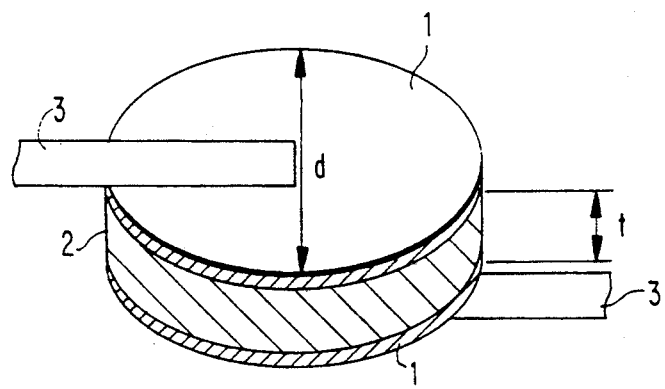
FIG. 1 shows an electrical device according to the invention.

In the composition according to the invention, a particular carbon black having both a large particle diameter and a high dibutyl phthalate absorption is dispersed in any of a broad range of crystalline polymers. The carbon black used in the present invention has an average particle diameter of at least about 60 millimicrons (m$\mu$), preferably an average diameter of at least about 70 millimicrons, and most preferably at least about 80 millimicrons. The maximum average particle diameter is at most about 500 millimicrons, preferably at most about 400 millimicrons, and more preferably at most about 350 millimicrons. Most preferably the average particle diameter is from about 80 to 110 millimicrons. The average particle diameter D of the carbon black is measured by conventional electron microscopy, as described in detailed by K. Kinoshita in *Carbon: Electrochemical and Physiochemical Properties* 45–48 (Wiley Interscience 1987).

A second important characteristic of the carbon black used in the composition according to the invention is its DBP absorption. The DBP absorption of the carbon black is at least about 80 cc/100 g, preferably at least about 90 cc/100 g, and most preferably at least about 100 cc/100 g. The maximum DBP absorption is about 400 cc/100 g, and is more preferably about 200 cc/100 g. Preferably the DBP absorption range of the carbon black is from about 100 to 140 cc/100 g, and most preferably the DBP absorption range is from about 110 to 140 cc/100 g. DBP absorption is measured by the procedure of ASTM D-2414-79.

Conventional carbon blacks having an average particle diameter larger than about 60 millimicrons are usually classified as low grade carbon blacks, such as thermal blacks, and have high electrical resistance. Accordingly, conductive polymer compositions comprising a mixture of polymer and these low grade carbon blacks generally do not have good electrical conductivity. DBP absorption is related to the well-known structure of carbon blacks which is determined by the average size of aggregates, that is carbon-carbon jointing chain size. Low grade carbon blacks of average particle diameter larger than about 60 millimicrons generally have a DBP absorption lower than about 65 cc/100 g. The minimum DBP absorption value of 80 cc/100 g of the large carbon blacks used in the invention is the value of a conventional carbon black having an average particle diameter of only 50 millimicrons.

Table 1 shows the physical properties of various types of carbon blacks, including carbon blacks of this invention which include commercially available ME 010 and 011 (Tokai Carbon Co., Ltd., 1-2-3 Kita-Aoyama, Minato-ku, Tokyo 107, Japan). ME 010 and 011 have a very large average particle diameter, 90 millimicrons, and a small surface area, 21-23 m²/g, which are nearly equal to the values for Thermal black (ASTM Designation N907) or Semi-Reinforcing Furnace (SRF) black (ASTM Designation N762-787) However, ME 010 and 011 have DBP absorption numbers of 116 and 135, which are much higher than the value of thermal or furnace blacks, and nearly equal to the value of HAF, SAF or acetylene black which are higher conductive carbon than thermal or furnace blacks. The rubber grade carbon blacks are classified in grades by standard ASTM designation according to ASTM D1765-88b, on the basis of the average particle size of carbon black as determined by electron microscope measurement. ASTM D1765-88b shows the typical physical properties of each of the standard grades of carbon blacks. However, ME 010 and 011 differ from the standard grades of carbon blacks because they have high DBP absorption despite having a very large particle size.

TABLE 1

| Carbon Black | Particle Size (mμ)[1] | Surface Area (m²/g)[1] | DBP Absorption (cc/100 g)[2] |
| --- | --- | --- | --- |
| Ketjenblack EC | 30 | 800 | 360 |
| Vulcan XC-72 | 30 | 254 | 178 |
| DENKA acetylene black | 40 | 61 | 125 |
| Vulcan 9 (ISAF) | 19 | 140 | 114 |
| DIA black H (HAF) | 30 | 86 | 120 |
| Sterling SO (FEF) | 41 | 42 | 122 |
| Regal SRF-S (SRF) | 60 | 30 | 64 |
| ASAHI Thermal (FT) | 80 | 24 | 28 |
| Sevacarb MT (MT) | 350 | 7 | 41 |
| ME 010 | 90 | 21 | 116 |
| ME 011 | 90 | 23 | 135 |

| Carbon Black | Iodine adsorption (mg/g) | Volatility (%) | pH |
| --- | --- | --- | --- |
| Ketjenblack EC | 800 | 0.5 | 9.0 |
| Vulcan XC-72 | | 1.5 | 5.0 |
| DENKA acetylene black | 105 | 0.2 | |
| Vulcan 9 (ISAF) | | 1.5 | 7.0 |
| DIA black H (HAF) | 81 | 1.0 | 7.5 |
| Sterling SO (FEF) | | 1.0 | 7.5 |
| Regal SRF-S (SRF) | | 1.0 | 9.0 |
| ASAHI Thermal (FT) | 27 | 1.0 | |
| Sevacarb MT (MT) | | 0.5 | 9.5 |
| ME 010 | 18 | 0.5 | 6.0 |
| ME 011 | 20 | 0.5 | 6.0 |

[1] ASTM d 3037
[2] ASTM D 2414

The values of surface area A given herein are measured by the well-known nitrogen adsorption method, and for details of the measurement of D and S, reference should be made to "Analysis of Carbon Black" by Schubert, Ford and Lyon, Vol., 8, *Encyclopedia of Industrial Chemical Analysis* 179, (John Wiley and Son, New York 1969).

B. Polymer

The polymeric component can contain one or more crystalline polymers, or it can also contain amorphous polymers, e.g., up to about 75% by weight. The crystalline polymer preferably has a crystallinity of at least about 10%, particularly at least about 20%, and a maximum crystallinity of about 98%. The crystallinity of the polymer is preferably from about 20 to 40%, though the preferred crystallinity depends on the amount of carbon black in the composition. Crystallinities may be measured by X-ray crystallography, and are given for representative polymers of the invention in the *Encyclopedia of Polymer Science Technology*, 449-528 (John Wiley & Son, New York 1972).

Suitable polymers include polyolefins, especially polymers of one or more alpha-olefins, e.g., polyethylene, polypropylene and ethylene/propylene copolymers; copolymers of one or more alpha-olefins, e.g., ethylene, with one or more polar comonomers, e.g., vinyl acetate, acrylic acid, ethylacrylic acid (and their salts), ethyl acrylate and methyl acrylate; polyarylenes, e.g., polyarylene ether ketones and sulfones and polyphenylene sulfide; polyesters, including polylactones, e.g., polybutylene terephthalate, polyethylene terephthalate and polycaprolactone; polyamides; polycarbonates; and fluorocarbon polymers, i.e., polymers which contain at least 10%, preferably at least 20%, by weight of fluorine, e.g., polyvinylidene fluoride, polytetrafluoroethylene, fluorinated ethylene/propylene copolymers, copolymers of ethylene and a fluorine-containing comonomer, e.g., tetrafluoroethylene, and optionally a third comonomer; and these polyolefins or polyolefin copolymers modified with minor amounts of maleic acid, epoxy or isocyanate groups.

Preferred polymers include polyethylene, preferably high density polyethylene, and a copolymer of ethylene and a polar copolymer, preferably acrylic acid or vinyl acetate. The copolymer may be modified to contain maleic acid or epoxy groups. These polymers can be used alone or in combination. A preferred copolymer contains about 80 to less than 100% by weight of an ethylene such as high density polyethylene and more than 0 to 25% by weight of a comonomer.

As described in more detail below in the examples, the polymer component of the present invention is not particularly restricted, so long as the minimum crystallinity characteristics are satisfied, and the polymer may be freely selected from a wide range to meet particular physical or electrical performance requirements of the PTC composition.

For example, preferred ethylene polymers include high density polyethylene (MFR (Melt Flow Ratio) 0.3-50); low density polyethylene (MFR 0.3-50); copolymers of ethylene and a polar copolymer including vinyl acetate (VA content 2-46%, m.p. 108°-67° C.), acrylic acid (AA content 7-20%), ethyl acrylate (EA content 9-35%, m.p. 91°-65° C.), methacrylic acid (crystallinity 25%, MMA content 9-12%, m.p. 80°-100° C.) and methyl methacrylate (MMA content 10-40%); and terpolymers of ethylene, vinyl acetate and a minor amount of glycidyl methacrylate (crystallinity 40-50%, VA content 8-10%, GMA content 1-5%, m.p. 90-100° C.). A modified copolymer may also be used, e.g., a copolymer of ethylene and vinyl acetate modified with a minor amount of maleic acid (m.p. 80-90° C.).

Where it is not necessary to limit the tripping temperature, high density polyethylene is preferred, for example, Hizex 2200J (made by Mitsui Petrochemical Industries, Ltd.). If it is necessary to limit the tripping temperature below 100° C., it is preferred to use a copolymer of ethylene and methacrylic acid and its metallic salt, i.e., an ionomer, such as Hi-Milan 1650 (made by DuPont Mitsui Polychemical Corp.), or a terpolymer of ethylene and vinyl acetate and glycidyl methacrylate, such as Bondfast 7B (manufactured by Sumitomo Chemical, Ltd.). Devices containing these copolymers typically have a tripping temperature of 70-75° C.

The selection of polymer depends on the desired properties of the PTC composition. One significant property is the maximum temperature of the tripped protective circuit device comprising the conductive polymer composition. For example, when it is high, fluoropolymers are suitable but when it is below 100° C., copolymers of polyolefins are suitable. Another important requirement is electrical resistance. Generally, for use in circuit protection devices lower resistance is desirable because the power loss in the circuit protection device in a normal state is preferably as small as possible. The resistance of the device is determined by the electrical resistivity of the conductive polymer composition and the contact resistance between the electrodes and the composition. The electrical resistivity is determined by the formulation of the composition, e.g., polymer, carbon black and its content. The contact resistance is determined by the bonding between the electrodes and the polymer composition Copolymers of polyolefins, e.g., copolymers of ethylene and one or more carboxyl- or ester-containing monomers, or olefin copolymers modified to contain functional groups such as epoxy or isocyanate groups are preferred.

C. Composition

The amount of carbon black in the composition should be such that the composition has a resistivity of at most about 100 $\Omega$-cm, preferably at most about 50 $\Omega$-cm, especially at most about 20 $\Omega$-cm, particularly at most about 10 $\Omega$-cm, at a temperature between $-40°$ C. and $T_s$, and preferably at 20° C. If desired, the resistivity can be remarkably reduced, for example, to less than about 7 $\Omega$-cm, preferably less than about 5 $\Omega$-cm, particularly less than about 3 $\Omega$-cm, especially less than about 1 $\Omega$-cm. The amount of carbon black needed to achieve such resistivity, in combination with the desired PTC behavior, will depend on the polymer component, the carbon black and any other particulate filler present, and the method used to prepare and shape the composition.

The weight ratio of the carbon black and any other particulate filler in the composition to the polymer has an important influence on the electrical characteristics of the composition. The crystallinity of the polymer is an important factor to be considered in addition to the amount of carbon black, as will be appreciated by one skilled in the art. The amount of the carbon black in the composition is typically from about 50 to 150 PHR (parts by weight per 100 parts by weight of resin) for compositions containing copolymers. The amount of carbon black is typically from about 40 to 120 PHR for polymers such as polyethylene. Without limiting the scope of the present invention, applicants have found the following compositions to be effective for producing PTC polymer compositions according to the invention. For high density polyethylene, the range of carbon black is suitably from about 50 to 110 PHR and preferably from about 65 to 85 PHR. For a terpolymer of ethylene, vinyl acetate and glycidyl methacrylate, the amount of carbon black is preferably about 60 to 120 PHR, more preferably from about 70 to 100 PHR. For an ionomeric copolymer of ethylene and methacrylic acid and its metallic salt, the amount of carbon black is from about 60 to 120 PHR, preferably from about 70 to 100 PHR. Compositions having smaller amounts of carbon black provide higher dielectric strength and relatively low conductivity, e.g., above 100 V/mm and below 100 -cm. Compositions having higher amounts of carbon black provide higher conductivity and lower dielectric strength, e.g., below 10 $\Omega$-cm and above 50 V/mm.

The ratio by volume of the carbon black to the polymer component can be calculated for any desired polymer based on the weight ranges set forth above, and is preferably from about 0.15 to 0.65.

The method used to disperse the carbon black in the polymer and to shape the composition, and in particular the power consumed in the method, has an important influence on the electrical characteristics of the composition. If the power consumption is too great, the composition tends to have too high a resistivity at temperatures below $T_s$ and/or to have unsatisfactory electrical stability on aging at elevated temperatures; on the other hand, if the power consumption is too low, this also can result in a composition which exhibits unsatisfactory PTC behavior. The methods disclosed for preparing dispersions of carbon black in crystalline polymers disclosed in U.S. Pat. No. 4,237,441 are suitable for preparation of the novel dispersions according to the present invention. Although any method can be used to disperse the filler component in the polymer component, the methods of most practical interest comprise subjecting a mixture of the solid polymer and the filler component to mechanical shear working (and optionally also to external heating) which causes the polymer to melt and disperses the filler in the molten polymer. The dispersion can be carried out in, for example, a Banbury mixer, a roll mill or a single screw or twin screw extruder. The dispersion may be extruded directly into the final shaped form desired or may be removed from the mixer in any convenient way, chopped into small pieces, and subsequently melt-shaped, e.g., by extrusion, molding or sintering.

Typically, the composition is extruded into a rod form, cooled in water and then pelletized. The pellets are extruded at a temperature above the melting point of the composition to form a film. The film is sandwiched between two thin metal foils, and pressed at a temperature above the melting point of the composition to make a laminate sheet. In order to reduce contact resistance, and provide stable conductivity, heat treatment or heat pressing at a temperature above the melting point of the polymer composition should be performed prior to crosslinking. The temperature in this annealing step is typically in a range from the melting point to about 300° C., preferably a temperature from about 30 degrees above the melting point to 280° C., and most preferably at a temperature about 50 degrees above the melting point. The material is preferably annealed at this temperature for at least about 5 minutes, more preferably at least about 10 minutes, and at most about 60 minutes, at a pressure of at least about 1 kg/cm², and preferably about 30 kg/cm², after which it is cooled to room temperature while being maintained under the same pressure.

The laminate sheet is preferably crosslinked, for example, by irradiation with an accelerated electron beam, or by chemical crosslinking or silane crosslinking, to form a crosslinked PTC polymer sheet. The laminate sheet is then cut into small pieces, of square or other shape. A metal conductor is attached to the metal foil by a conventional process, such as welding, to provide an electrical lead. Typically the device is contained in an electrically insulating housing, which may be thermally conductive or thermally insulating, as required. Suitably the housing may include an oxygen barrier, e.g., as disclosed in U.S. Pat. No. 4,315,237, which is incorporated herein by reference.

In addition to the above-described annealing treatment prior to crosslinking, it is advantageous to subject the electrical device to a further heat treatment after crosslinking and finishing steps. The laminated composition is thermally treated by maintaining the composition, by external heating thereof, for at least 1 minute at a temperature at which the resistivity of the composition is between 100 Ω-cm and the peak resistivity, to provide a thermally treated composition with a resistivity at at least one temperature between $-40°$ C. and $T_s$ that is from 0.5 to 2.0 times the resistivity of said composition at the same temperature before said thermal treatment.

Alternatively, the laminated conductive PTC polymer composition may be thermally treated by electrical resistance heating which comprises passing current through the composition for at least 1 minute sufficient to maintain the composition at a temperature between $T_s$ and $(T_s+50)°$C., to provide a thermally treated composition with a resistivity at at least one temperature between $-40°$ C. and $T_s$ that is from 0.5 to 2.0 times the resistivity of the composition at the same temperature before said thermal treatment.

The carbon black should be dispersed sufficiently to give a composition which has substantially uniform electrical properties, and up to a certain point an increase in the power consumed in the process often results in a composition which shows more intense PTC effect. On the other hand, if the power consumed in the process is too great, this can cause the composition to be electrically unstable when aged at elevated temperatures and/or can cause the composition to have too high a resistivity at temperatures below $T_s$. Advantageously, the total energy used in preparing and melt-shaping the composition should be from 1 to 300 hp. hr. per cubic foot of the composition, and is preferably 1 to 50, especially 1 to 25, hp.hr.ft.$^{-3}$.

According to the invention, it is possible to prepare conductive polymer compositions which exhibit PTC behavior with a $T_s$ above 0° C., which have a resistivity of less than 7 Ω-cm at at least one temperature between $T_s$ and $-40°$ C., and which have a peak resistivity above 1000 Ω-cm and/or exhibit satisfactory electrical stability on aging at elevated temperatures.

The peak resistivity of the compositions of the invention is preferably at least 1,000 Ω-cm, more preferably at least 5,000 Ω-cm, particularly at least 10,000 Ω-cm. A typical composition according to the invention has a resistivity at 20° C. of 5 Ω-cm, and a peak resistivity of $1\times10^5$ Ω-cm.

D. Additives

The composition can also contain non-conductive fillers, including arc suppression agents, antioxidants and radiation crosslinking agents, antioxidants and other auxiliary agents.

The composition preferably comprises an antioxidant or other additive which will stabilize the composition against degradation, e.g., thermo-oxidative degradation, the amount of such additive generally being 0.005 to 10% by weight, based on the weight of the polymer. Conventional antioxidants, e.g.,4,4'-thiobis-6-tert-butyl-3-methylphenol or tetrakis-[methylene-3(3',5'-di-tert-butyl-4'-hydroxyphenyl) propionate]methane, are preferably used in amounts of from 0.05 PHR to 0.5 PHR. The additive includes a hindered phenol such as those disclosed in U.S. Pat. No. 3,986,981 (Lyons) and those manufactured by Ciba Geigy under the trade name Irganox. The choice of antioxidant will of course be dependent on the polymer, and it is important to note also that some materials which are generally useful as antioxidants cause the electrical properties of the composition to become less stable on exposure to elevated temperatures.

Conventional fillers may also be added to the PTC composition according to the invention, including hydrated alumina, magnesium hydroxide and talc, in amounts from about 5 to 150 PHR. The composition may contain other particulate fillers, for example non-conductive inorganic or organic fillers, e.g., zinc oxide, antimony trioxide or clay. The term "filler component" is used herein to denote all the particulate fillers in the composition. In order to obtain a composition which has desirable electrical characteristics, the value of the quantity $$\frac{S}{D} \times \frac{\text{volume of carbon black}}{\text{volume of polymer component}} \qquad (1)$$

is suitably at most about 1.0, more preferably less than 0.5, particularly less than 0.4, especially less than 0.1.

When the composition is to be cross-linked it may also contain a compound which can be decomposed by heat to initiate cross-linking, or a compound which promotes cross-linking when the composition is irradiated. Any conventional crosslinking method may be used. Electron beam irradiation may be used at a dosage of at least about 3 Mrad, preferably at least about 5 Mrad, more preferably at least about 10 Mrad, and includes the radiation crosslinking methods disclosed in U.S. Pat. Nos. 4,845,838, 4,857,880 and 4,907,340, which are incorporated herein by reference. For chemical crosslinking, the PTC polymer composition may contain a crosslinking agent, such as dicumyl peroxide, in an amount of about 2 weight percent. Other peroxides, including 2,5-dimethyl-2,5-di-benzoyl peroxy hexane, and t-butyl peroxy benzoate may also be used. An additive such as triallylcyanurate, or trimetylol propane trimethacrylate may be used as a chemical crosslinking accelerator. A conventional silane cross-linking process, such as that described in U.S. Pat. No. 4,277,155, which is incorporated herein by reference, may be used. Whatever crosslinking method is selected, the gel content of the cured polymer should be at least about 20%, preferably at least about 40%.

II. Electrical Device

The electrical device according to the invention includes, for example, a circuit protection device, a thermal sensor and a thermal current limiting device. The devices, which are particularly useful in circuits carrying a steady state current of 0.1 amp or more, can protect the circuit against excessive current which may occur, e.g., as a result of a short or a voltage surge, or against excessive temperature, or both. A circuit protection device typically functions by increasing its resistance when the current flowing through the device exceeds the tripping current or the temperature of the circuit protection device exceeds the tripping temperature.

The circuit protection device has a normal operating condition in which the device has a low resistance and is in stable thermal equilibrium with its surroundings; however, when an overcurrent-type fault condition occurs, the device generates heat by $I^2R$ heating at a rate which exceeds the rate at which heat can be lost from the device, thus causing the temperature of the device to rise in excess of the tripping temperature, whereupon the resistance of the device rapidly rises until the device reaches a new, high temperature, stable thermal equilibrium state. In order to ensure that the circuit current is reduced to a sufficiently low level, the ratio of (a) the current in the circuit in the normal operating condition to (b) the current in the circuit when the device is in the high temperature equilibrium state, is at least 2, preferably at least 10, and more preferably at least 20.

Many of the devices of the invention can be used to protect circuits against both excessive environmental temperatures and excessive currents. On the other hand, for optimum performance, the details of the device and its thermal environment should be selected with a view to the expected fault condition, and there are some circuits and environments in which a given device will function in accordance with the invention in response to an excessive increase in current, but not in response to an undesirable increase in environmental temperature, and vice versa. The devices are particularly useful in circuits which have a current greater than 0.1 amp, e.g., 0.1 to 20 amps, preferably 0.1 to 10 amps, in the normal operating condition, and can be designed to pass steady state currents of up to 15 amps or even more at 20° C.

The way in which the device operates is in part dependent on the rate at which heat can be removed from it. This rate will depend on the heat transfer coefficient of the device, and we have found that in general the device should have a heat transfer coefficient, measured in still air and averaged over the total surface area of the device, of 2.5 to 5 milliwatts/°C.-cm$^2$. The optimum thermal design of the device will depend upon the fault condition against which it is to protect. In most cases, the device should react as quickly as possible to the fault condition.

The circuit protection devices of the invention will generally comprise an electrically insulating jacket which surrounds the PTC element and the electrodes and through which pass the leads to the electrodes. This jacket will also affect the thermal properties of the device, and its thickness will be selected accordingly. Preferably the device comprises an oxygen barrier layer as described in U.S Pat. No. 4,315,237, which is incorporated herein by reference.

A. Resistance

We have found that an electrical device composed of electrodes in intimate contact with a conductive polymer composition comprising a mixture of a polymer and the above carbon black, in which the amount of carbon black is appropriate for providing low resistivity to the composition (e.g., at most about 20 Ω-cm), has very low resistance, e.g., at most about 500 mΩ, and unexpectedly high dielectric strength, e.g., about 600 V/mm.

The resistance of the device at the normal operating condition of the circuit, referred to herein as $R_{dn}$, which in the simple case of a device comprising two metal electrodes in contact with the PTC element, will be primarily determined by the resistance of the PTC element, is typically in the range of 1.0 to 5000 mΩ, preferably from about 5.0 to 1000 mΩ, and most preferably from about 10 to 500 mΩ. In order to provide devices having such low resistance, the PTC polymer composition typically has a resistivity of at most about 1000 Ω-cm, preferably at most about 500 Ω-cm, and particularly preferably at most about 100 Ω-cm.

To obtain a device having such low resistance, the PTC layer should be as thin as possible, for example, from about 100μ to 1 mm, preferably 100μ to 500μ. The equivalent diameter of the device is in the range of 3 to 80 mm, preferably 5 to 50 mm, though substantially greater thicknesses and/or equivalent diameters can be used.

It is also necessary that, in the circuit in which the device is employed, $R_{dn}$ is less than $0.1 \times R_L$ ohm, where $R_L$ is the resistance of the remainder of the circuit which is in series with the device; $R_{dn}$ is preferably less than $0.04 \times R_L$, particularly less than $0.001 \times R_L$. $R_L$ is preferably substantially constant, i.e. does not vary by more than ±25%, in the temperature range of operation of the circuit. $R_L$ will generally be a resistive load, but may be in whole or in part capacitative or inductive. However, if $R_L$ does vary substantially over the temperature range of operation, the device can protect the circuit against excessive variations of $R_L$, by protecting against excessive current resulting from a reduction in $R_L$.

As will be appreciated from the above, the power of the device in the normal operating condition of the circuit will be very low and will be readily dissipated to the environment. On the other hand, when a fault condition develops, the electrical power of the device must first increase rapidly so that the power cannot be dissipated to the environment and then decrease until a high temperature stable equilibrium point is reached at which the power can be dissipated and the resistance of the device is sufficiently high to ensure that the circuit is "shut off", i.e. the current in the circuit is reduced to an appropriately low level. Since the electrical power dissipated in the device is dependent both on its resistance (which is dependent on its temperature) and the current passing through it, the device will shut off the circuit in response to an excessive temperature around the device or an excessive current in the circuit (or of course a combination of both). We have found that in order to reduce the current to the levels which are required in practical applications, the switching ratio, i.e., the ratio of the current in the circuit at the normal operating condition to the current of the circuit in the shut-off condition, must be at least 2, and is preferably substantially higher, for example at least 10, preferably at least 20.

Such an electrical device has an operating voltage in a circuit of about 1 to 50 V, and typically about 1 25 to 40 V. Above about 5 V, the breakdown voltage of the device is a critical factor, and the maximum operating voltage of the device is preferably about 30–35 V. A current limiting device should be capable of withstanding this voltage when the circuit fails.

Figure 2:
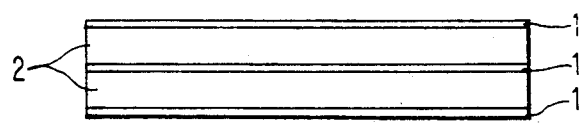
FIG. 2 illustrates an electrical device according to the invention having multiple electrode layers.

A typical circuit protection device according to the invention is described in FIG. 1, in which two sheets of metal foil 1 are laminated to a sheet of PTC material 2 having a diameter d and a thickness t. Lead conductors 3 are connected to each foil electrode layer 1, and provide suitable electrodes for connection in a circuit. A second circuit protection device, in which three electrodes 1 are bonded to two sheets of PTC material 2, is shown in FIG. 2.

The present invention is not limited to laminated sheet PTC materials, but includes devices in which the electrodes are in the shape of wires or posts, separated by PTC material in various shapes such as those disclosed in U.S. Pat. Nos. 4,724,417 and 4,857,880, which are incorporated herein by reference. Such devices may function primarily as current limiting devices, or as temperature sensing devices or a combination thereof.

B. Other Electrical Properties

Breakdown of a PTC element in an electrical device occurs when the electrical device is unable to limit current, and the resistance of the tripped device at a temperature above the switching temperature of the PTC composition falls rapidly. Breakdown is a short-term phenomenon. Because the PTC layer in an electrical device according to the invention has a very low resistance at normal operating temperature and is typically very thin, it will be appreciated that the breakdown voltage is closely related to the operating voltage in the circuit containing such a circuit protection device. The breakdown voltage depends on the rate at which voltage in the circuit increases, and typically the rate of increase in a circuit in short-circuit fault condition will be abrupt. In this case, the device ideally performs instantaneously to limit the current.

A device having a low resistance generally has a higher tripping current, and it will be apparent that the design of the device may easily be varied to provide a tripping current capacity suitable for any desired application by changing the device area and thickness of the PTC element. Typically, for devices according to the invention, the maximum current that can be passed through the device without tripping the device is about 15 amps. For example, when the dimensions of the PTC layer between two metal foil electrodes is 10 mm × 10 mm × 150μ, the tripping current is about 3 amps. If the device has a larger area, or a thinner PTC element, the tripping current is higher. The operating current for such a device in an electrical circuit will typically be about one-third or one-half of the tripping current, and can be suitably selected in accordance with accepted electrical design standards.

The PTC composition preferably has a dielectric strength of at least about 100 V/mm, preferably 200 V/mm, and most preferably at least about 400 V/mm, in the high temperature stable equilibrium condition, where $$\text{Dielectric Strength} = \frac{\text{Breakdown Voltage}}{\text{Thickness of PTC Composition}}.$$

When the current flowing through the circuit to be protected, and hence through the protection device increases beyond a certain limit, such as when a short circuit in the load occurs, or a voltage surge occurs, the temperature of the circuit protection device will rise until the tripping temperature of the device is reached, whereupon the resistance of the circuit protection device rapidly increases until the current is limited. The equilibrium temperature at which the loss of heat from the device to the environment is balanced by the heat produced by current flowing through the device is the "tripped temperature." Switching temperature, in contrast, is the maximum temperature at which the resistance of the device does not change, but above which resistance begins to rise. Tripping temperature, which is nearly equal to switching temperature, is the temperature at which $R_L = R_{dn}$ in a circuit, and is different from the tripped temperature of a circuit protection device. The conductive polymer composition preferably has a switching temperature of at most about 180° C., more preferably at most about 130° C., and most preferably at most about 100° C.

The equilibrium "tripped temperature" will depend on a number of factors, including the operating voltage of the circuit, and the power which the device can dissipate by thermal losses under different conditions. The power that can be dissipated by the device is dependent on the thermal conductivity of the medium surrounding the device, the movement (if any) of the medium and the surface area of the device, and the temperature of the medium surrounding the device.

Figure 6:
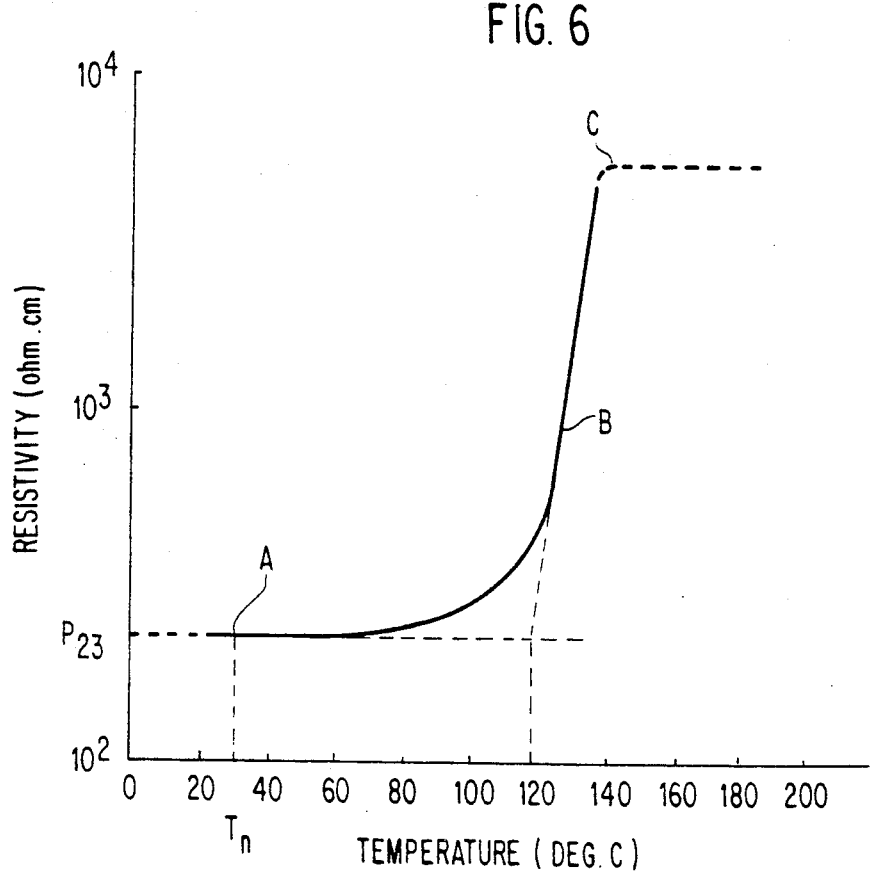
FIG. 6 is a graph showing a resistance-temperature characteristic of an electrical device of the invention, illustrating the PTC behavior of a composition according to the invention.
Figure 7:
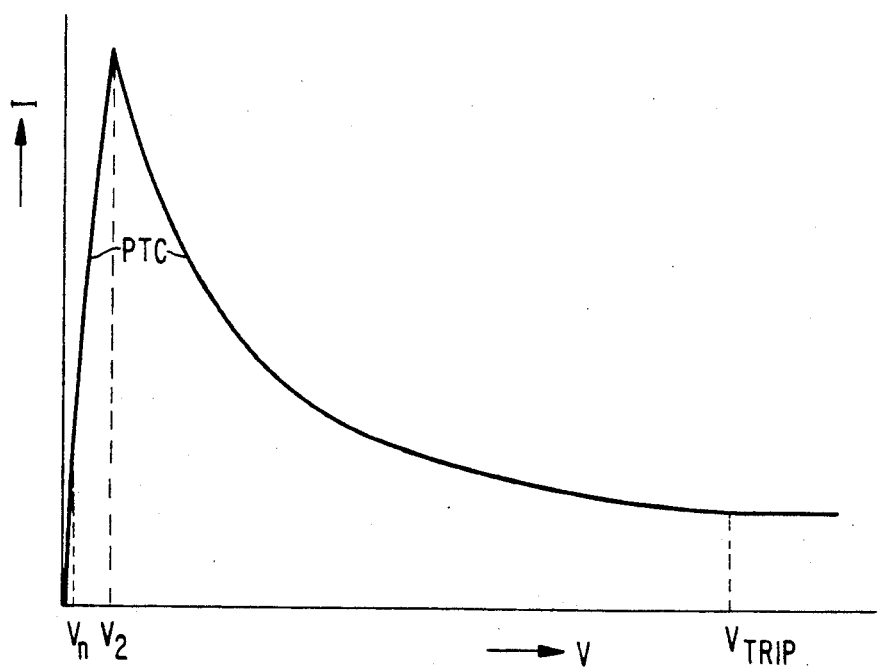
FIG. 7 is a graph showing a current-voltage characteristic of an electrical device of the invention.

A circuit protection device of the invention is generally connected in series between the device or system to be protected, with the series combination connected directly across a power source, that is, without the use of another series resistor or the like in the circuit. FIG. 7 is a graph showing the current through the circuit protection device as a function of the voltage across the device in such a circuit configuration. FIG. 6 depicts the resistance of the device as a function of temperature. As depicted in FIG. 7, when the protected device is operating normally, most of the power source voltage is impressed across the protected device, and only a small voltage $V_n$ is then present across the circuit protection device. The temperature of the circuit protection device is then a relatively low temperature $T_n$. If the protected device short circuits for some reason, the voltage across the circuit protection device will rise, causing a corresponding increase in the amount of power dissipated in the circuit protection device, and hence an increase in the temperature of the device. When the switching voltage $V_s$ is reached (at a switching temperature $T_s$), the resistance of the circuit protection device rises rapidly. When the voltage across the circuit protection device reaches $V_{trip}$, which may be essentially the entire power source voltage, the circuit protection device is in its high resistance state at a tripped temperature $T_{trip}$. The value of $T_{trip}$ is dependent upon the source voltage and the rate at which the circuit protection device can dissipate heat to the medium with which it is in thermal contact.

From this description, it will be clear that the tripped temperature in a circuit will depend upon the applied voltage, which the circuit protection device must be capable of withstanding. Tripped temperature must be defined for a specific voltage, and as used herein the term is defined as measured at an applied voltage of 5 volts. However, it will be understood that in particular applications the applied voltage may vary considerably, and in such applications it will be desirable to limit the tripped temperature to avoid damage to other circuit components.

In general, in many applications the tripped equilibrium temperature should be below 100° C., preferably at most about 80° C., and most preferably at most about 60° C.

C. Physical Description

The electrical device according to the invention typically contains two electrodes in electrical contact with and separated by a conductive PTC polymer body. The invention is not limited to any particular configuration of the PTC polymer body, which may be a film, cylinder, strip, or irregular solid body, and is not limited to any particular shape, material or disposition of electrodes, which may be foils, mesh, plates, perforated plates or foils, posts, wires, cables, or other shapes, including those described in U.S. Pat. No. 4,352,083, which is incorporated herein by reference. Preferably the electrical device has a film or sheet of PTC material laminated on both sides with a metal foil electrode, and a circular or square shape. The electrical device typically includes other conventional elements, such as an oxygen barrier layer or layers, a moistureproof housing, and the like. While the invention includes a single shaped PTC polymer layer, it also includes an electrical device having plural PTC polymer layers having different resistivities, or differing in their degree of crosslinking, as disclosed in U.S. Pat. No. 4,907,340.

The type of electrode is not critical, and may be freely selected from electrodes conventionally bonded to PTC polymer materials. Conductive metal electrodes are preferably used, and preferably copper, tin-coated or -plated copper, or nickel foil electrodes having a microrough surface, such as those described in U.S. Pat. No. 4,689,475, which is incorporated herein by reference, are used. A microrough surface may be produced by rolling, mechanical roughening or chemical roughening. Particularly, a microrough electrode foil produced by electroless deposition of a copper or nickel layer comprising micronodules and macronodules, as described in U.S. Pat. Nos. 4,800,253 and 4,689,475, which are incorporated herein by reference, preferably is used.

The thickness of the electrodes is not critical, and when foil electrodes are used, each electrode is typically from about 20 to 100$\mu$ thick, preferably from about 30 to 70$\mu$ thick.

The polymers used in this invention are commonly crystalline polymers. Higher crystalline polymers tend to provide higher breakdown voltage. However, the contact resistance between the composition and electrodes is so important that sometimes a polymer having lower crystallinity is used in consideration of the desired balance between resistance and breakdown voltage. Also, protection circuit devices employing this composition are commonly used when they are packed in a small housing. Accordingly, when the device is tripped, if the temperature of the switched device is nearly equal to the melting temperature of the polymer, damage to the neighboring devices or plastic housing may result. Therefore, it is highly desirable that the maximum tripped temperature of the protection circuit device not exceed about 100° C. This is also an important criterion of polymer selection.

Such devices generally have a resistance of at most about 1000 m$\Omega$, preferably at most about 500 m$\Omega$ at room temperature, and usually employ a PTC conductive polymer composition having a volume resistivity of at most about 100 $\Omega$-cm, preferably at most about 50 $\Omega$-cm. Preferred circuit protection devices of this invention comprise two parallel electrodes which are in direct physical and electrical contact and optionally chemically bonded with the PTC conductive composition.

The electrodes and the PTC composition are preferably arranged so that the current flows through the PTC composition over an area of a diameter d of the device with a path length t, such that d/t is at least about 2, preferably at least about 10, especially at least about 20, as illustrated in FIG. 1. The thickness of the device (i.e., including PTC polymer layer, electrodes, oxygen barrier and housing) is preferably thin, and in the range of 0.020 to 3.0 mm, preferably 0.03 to 1.0 mm. The equivalent diameter of the device is in the range of 3 to 80 mm, preferably 5 to 50 mm. The term "equivalent diameter" means the diameter of a circle having the same area as the area over which the current flows; this area may be of any shape but for ease of manufacture of the device is generally circular or rectangular. It is generally preferred to use two planar electrodes of the same area which are placed opposite to each other on either side of a flat PTC element of constant thickness. However, other arrangements are possible to meet particular dimensional or electrical requirements, for example more than two electrodes, more than one PTC element, a wedge-shaped PTC element or curved laminar electrodes with a curved laminar PTC element of constant thickness between them. In such other arrangements, the way in which the d/t ratio should be calculated will be apparent to those skilled in the art.

The compositions of the invention are preferably in the form of shaped articles which have been prepared by a process which includes a melt-shaping step, e.g., extrusion or molding.

The PTC element will generally be of uniform composition, but may for example comprise two or more layers having different resistivities and/or different switching temperatures. The electrodes may be in direct contact with the PTC element or one or more of them may be electrically connected thereto through another conductive material, e.g., a layer of a relatively constant resistivity conductive polymer composition.

The circuit protection device should withstand the voltage of the power source after tripping in order to successfully limit the current flow through the circuit when the circuit is in a fault state. Recent electrical devices, for example, cordless electric drills or automobiles, often are driven with high capacity batteries, the voltage of which is greater than 20 V, sometimes up to 25 V.

The thickness of the device is generally so thin that the device has to withstand very high voltage stress, for example, when the thickness of PTC composition is 0.25 mm and the supply power voltage is 25 V, the voltage stress of the PTC composition is 100 V/mm. The widely used conventional PTC polymer compositions can only withstand a voltage stress up to about 80 V/mm, that is, they have a dielectric strength of no more than about 80 V/mm. Providing a margin for security, a circuit protection device according to the invention should have a dielectric strength of at least about 200 V/mm, preferably at least about 400 V/mm, and most preferably at least about 600 V/mm, when measured at standard voltage increments at the tripped temperature, as defined herein. Preferably, the dielectric strength is from about 600 to 800 V/mm thus determined.

It will be noted that in the circuits described above, the parameters of the circuit protection device are defined by reference to the other circuit elements, the medium around the device and the rate at which heat can be lost from the device to that medium. However, the parameters of a circuit protection device which is useful for many purposes can be defined by reference to the way in which it will behave when placed in a standard circuit and in a standard thermal environment. Accordingly, the present invention provides a circuit protection device which comprises a PTC element composed of a PTC composition having a switching temperature $T_s$ and at least two electrodes which can be connected to a source of electrical power and which, when so connected, cause current to flow through said PTC element; said device being such that a test circuit which consists of said device connected in series with a source of power having a voltage of at most 50 V, said device being in still air and when the still air is at 25° C. there is an unstable equilibrium between the rate at which the device generates heat by $I^2R$ heating and the rate at which heat is lost from the device, has a stable operating condition in which (A) current flows through said PTC element over an area of equivalent diameter d with an average path length t such that d/t is at least 2;

(B) said device is at a temperature $T_{dn}$ at which the device has a resistance $R_{dn}$ less than 1 ohm and at which said PTC composition has a resistivity of less than 10 $\Omega$-cm;

(C) the air is at a temperature $T_n$ which is less than 25° C.; and (D) there is a stable equilibrium between the rate at which the device generates heat by $I^2R$ heating and the rate at which heat is lost from the device.

Figure 3:
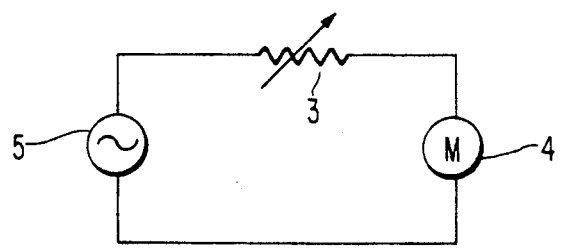
FIG. 3 shows a circuit containing an electrical device according to the invention.
Figure 4:
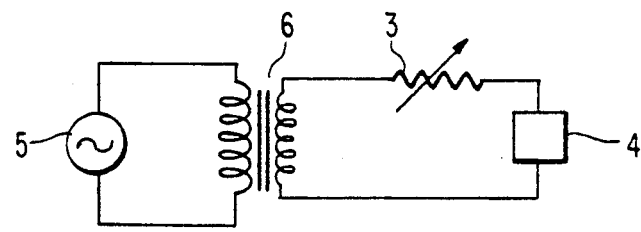
FIG. 4 shows a circuit containing an electrical device according to the invention.
Figure 5:
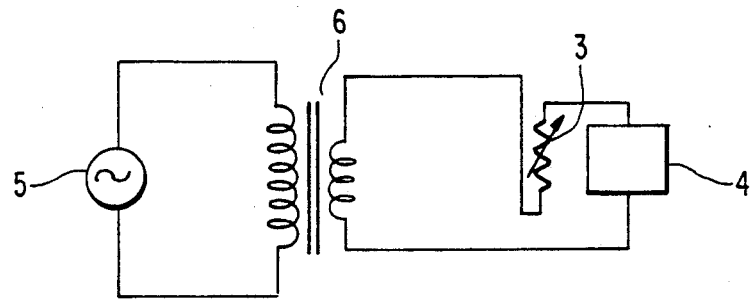
FIG. 5 shows a circuit containing an electrical device according to the invention.

A typical circuit according to the invention is shown in FIG. 3, where the circuit protection device according to the invention 3 is connected in series with a load 4 and a power source 5, such as a battery. A second circuit according to the invention is shown in FIG. 4, where the power source for the circuit including circuit protection device 3 and load 4 is provided by transformer 6. A further circuit according to the invention, in which the current limiting function of the electrical device is combined with a thermal sensing function, is illustrated in FIG. 5, where the electrical device 3 is in thermal contact with the load 4.

The invention is described herein mainly by reference to circuits containing a single PTC circuit protection device, but it is to be understood that the invention includes circuits which contain two or more such devices which can be tripped by different fault conditions and that the term circuit protection device is used to include two or more electrical devices connected in parallel and/or in series which together provide the desired protective effect.

As mentioned above and as shown in FIG. 3, a PTC electrical device of the invention is generally connected in series with the load $R_L$ (the device to be protected) and the source, with no current limiting resistor in the series circuit. With this arrangement, under normal conditions, the voltage $V_{PTC}$ across the PTC device is:

$$V_{PTC} = \frac{R_{PTC}}{R_{PTC} + R_L} V_{PS}$$

where $V_{PS}$ is the power source voltage. Since, in normal operations and prior to tripping, $R_{PTC}$ is much less than $R_L$, almost all of the power source voltage $V_{PS}$ is impressed across the load.

If, however, the load suffers a short-circuit failure, the power source voltage $V_{PS}$ will be directly applied across the PTC device. Since the PTC device is then in a low resistance state, a high inrush current will flow through the device, causing internal ohmic heating. When the temperature of the PTC device reaches the switching temperature $T_S$, as depicted in FIG. 6, the resistance of the device rises rapidly, as a result of which the current through the series circuit is reduced to a small value. At that time, however, because the resistance of the PTC device is much greater than that of the load and there is no further series resistance to absorb any of the power source voltage, substantially all of the power source voltage will be impressed across the PTC element. To operate successfully, the breakdown voltage of the PTC element must be greater (by a safety margin) than the power source voltage; otherwise, the current through the series circuit would again rise.

Thus, the low breakdown voltage of conventional PTC devices severely limited their applications, restricting them to applications in which the power source voltage was low. On the other hand, the devices of the present invention, because of their much higher breakdown voltage, can be used in applications requiring a significantly higher power source voltage.

Some typical applications of the invention will now be discussed.

Portable personal computers have recently been developed having a printing capability and which are capable of operating for long time periods on a single battery charge. For this purpose, such a computer must be provided with batteries of a large power capacity, for instance, 15 Ni-Cd cells having a total voltage of 38 V and very small internal resistance, such as 750 milliohms, so as to be capable of supplying a very large current. If the disk drive or printer motor of such a computer, which normally has a resistance of about 10 ohms, suffers a short-circuit failure, there is a danger of destruction of the computer due to overheating or burning when the resulting current of about 50 amps flows through the failed circuit. However, such a danger can be avoided with the use of a circuit protection device of the invention placed in series with the battery. Suitably, the circuit protection device may have a thickness of 400 microns, a size of 10 mm on each side, and a normal resistance of 50 milliohms. Such a device can limit the current to about 0.1 amp so as to prevent serious damage to the computer. Conventional circuit protection devices cannot be used for such high current/high voltage applications due to their low breakdown voltage.

In another example, a circuit protection device of the invention can be used to protect the motor of a cordless electric screwdriver or the like, which must be compact and light for easy handling. Such applications ordinarily require a high-capacity battery, as an example, 10 lithium cells having a total output voltage of 30 V. To protect the motor against short circuits, a circuit protection device of the invention can be connected in series with the battery.

The present invention is now illustrated in greater detailed with reference to the following Examples, which are not to be construed as limiting the scope of the present invention in any way. Unless otherwise indicated herein, all parts, percents and ratios are by weight.

EXAMPLE 1

The ingredients listed in Table 2 were blended in a Banbury mixer at 150° C. for 10 minutes, and discharged on the rolls, after which the sheet of blended compound was pelletized. The mixed composition was melt-extruded into a thin film sheet approximately 0.2 mm thick. This sheet was sandwiched between two sheets of electrodeposited nickel foil 0.05 mm thick, each having a microrough surface in contact with the PTC polymer, where the microrough surface comprised micronodules approximately 5μ in diameter. The sandwich was pressed together at a temperature of 180° C. under a pressure of 50 kg/cm² for 30 minutes to make a sheet of laminated PTC composition in which the laminar PTC composition was 0.10 mm thick, and cooled to room temperature while under the same pressure. After heat treatment, the laminated polymer was crosslinked by electron beam irradiation at a dosage of 8 Mrads.

A square piece of the PTC laminate, 10 mm×10 mm, was cut from the laminated PTC composition sheet and nickel foil lead conductors were attached to each electrode. The physical properties of the PTC devices comprising the compositions described in Table 2 are also shown in Table 2. The polymer used in this example was a copolymer of ethylene and methacrylic acid and its zinc salt, having a crystallinity of about 25% and a melting point of about 98° C., Hi-Milan 1650 (DuPont Mitsui Polychemical Corp.). The antioxidant used in each example was 4,4′-thiobis-6-tert-butyl-3-methyl-phenol (Santonnox R). The PTC polymer layer in the examples was cross-linked to approximately 60% gel.

The amount of each carbon black used, as indicted in the table, was the most suitable amount providing the best PTC behavior and breakdown voltage.

The samples thus produced were each tested by the following methods. The AC breakdown voltage of each device was measured using an autotransformer, by increasing the voltage at a constant rate of 60 V/min at room temperature until breakdown was indicated by burning or ignition of the specimen. The resistance of the device was measured using a Wheatstone bridge at room temperature. The tripping current was measured using a constant DC voltage generator at room temperature in still air, increasing the voltage by steps of 50 mV, and maintaining the voltage at each increment for 2 minutes. The tripping current was calculated from the curve relating voltage and current. The tripped temperature was measured by thermocouples on the electrode surface of the device, when a voltage of 5 V was applied to the device in a tripped state.

No composition containing Asahi FT carbon black could provide a resistance less than 100 mΩ. The devices containing PTC layers containing ME 0101 and 011 exhibited excellent breakdown voltage and low resistance. The other carbon blacks such as Vulcan XC-72 and DENKA acetylene black provided inferior results for breakdown voltage in comparison with ME 010 and 011.

TABLE 2

| Ingredients | 1 | 2 | 3 | 4 | 5 |
|---|---|---|---|---|---|
| Hi-Milan 1650 | 100 | 100 | 100 | 100 | 100 |
| Vulcan XC-72 | 43 | | | | |
| DENKA acetylene black | | 51 | | | |
| Asahi FT | | | 120 | | |
| ME 010 | | | | 80 | |
| ME 011 | | | | | 78 |
| Antioxidant | 2 | 2 | 2 | 2 | 2 |
| Electrical resistance (mΩ) | 50 | 50 | 100 | 50 | 50 |
| Volume Resistivity (Ω-cm) | 5 | 5 | 10 | 5 | 5 |
| Breakdown Voltage (V) | 9 | 15 | 40 | 45 | 47 |
| Tripped Temperature (°C.)[1] | 87 | 85 | 83 | 80 | 80 |
| Tripping Current (Amps) | 3.1 | 3.2 | 2.9 | 3.2 | 3.2 |

[1] measured at 5 V.

EXAMPLE 2

The ingredients listed in Table 3 were mixed and the PTC devices were prepared by the same procedure as in EXAMPLE 1. The test results for these examples are shown in Table 3. The PTC composition containing Ketjenblack exhibited very low resistance and also very low breakdown voltage, while DIA black H showed intermediate values both for resistance and breakdown voltage which are not suitable. The polymer used in this example was a copolymer of ethylene and vinyl acetate in which a small amount of epoxy group was bonded in the polymer chain (Bondfast 7B, Sumitomo Chemicals, Ltd.). The crystallinity of this polymer was about 20% and the PTC layer in the electrical device was crosslinked to a degree of about 60%. The same antioxidant was used as in Example 1. The tripping temperature of each device was about 70° C.

The compositions containing this polymer had very low resistance and relatively low tripped temperature, which prevents heat damage to neighboring heat sensitive components.

TABLE 3

| Ingredients | 6 | 7 | 8 | 9 | 10 |
|---|---|---|---|---|---|
| Bondfast 7B | 100 | 100 | 100 | 100 | 100 |
| Ketjenblack EC | 40 | | | | |
| DIA black H | | 56 | | | |
| Regal SRF-S | | | 100 | | |
| ME 010 | | | | 84 | |
| ME 011 | | | | | 80 |
| Electrical Resistance (mΩ) | 40 | 55 | 80 | 50 | 50 |
| Volume Resistivity (Ω-cm) | 4 | 5.5 | 8 | 5 | 5 |
| Breakdown Voltage (V) | 8 | 23 | 48 | 43 | 46 |
| Tripped Temperature (°C.)[1] | 89 | 86 | 80 | 82 | 83 |
| Tripping Current (Amps) | 3.3 | 3.1 | 3.0 | 3.2 | 3.3 |

[1] Measured at 5 V.

EXAMPLE 3

The ingredients listed in Table 4 were mixed and PTC devices were prepared by the same procedure as in EXAMPLE 1. The polymer used in this example was a high density polyethylene (HIZEX 2200J, MITSUI Petrochemical Industries Ltd.) which is a highly crystalline polymer (90%) having a melting point of 120° C. The antioxidant used was tetrakis[ methylene-3-(3',5'-di-tert-butyl-4'-hydroxy-phenyl) propionate]methane (Irganox 1010). The PTC layer in each sample was crosslinked to a degree of approximately 60%.

The test results in Table 4 demonstrate a higher breakdown voltage compared with examples 1-2, resulting from the crystallinity of the polymer, but this PTC composition had a relatively high tripped temperature which might damage neighboring heat-sensitive components in an electrical device or equipment. It is clear that even when a highly crystalline polymer is used in the PTC composition, ME 010 and 011 provided higher breakdown voltage than other carbon blacks.

These results demonstrate that PTC compositions according to the invention, containing the specified carbon blacks with a wide range of crystalline polymers have higher breakdown voltage and withstand higher voltage stress than conventional PTC compositions when used in circuit protection devices for overcurrent.

TABLE 4

| Ingredients | Example No. | | | | |
|---|---|---|---|---|---|
| | 11 | 12 | 13 | 14 | 15 |
| Hizex 2200J | 100 | 100 | 100 | 100 | 100 |
| Vulcan XC-72 | 38 | | | | |
| Vulcan 9 | | 45 | | | |
| Sevacarb MT | | | 130 | | |
| ME 010 | | | | 75 | |
| ME 011 | | | | | 73 |
| Electrical resistance (mΩ) | 45 | 55 | 200 | 50 | 50 |
| Volume resistivity (Ω-cm) | 4.5 | 5.5 | 20 | 5 | 5 |
| Breakdown Voltage (V) | 65 | 90 | 150 | 130 | 130 |
| Tripped Temperature (°C.)[1] | 120 | 121 | 118 | 118 | 118 |
| Tripping Current (Amps) | 3.7 | 3.6 | 3.0 | 3.7 | 3.6 |

[1]Measured at 5 V.

While the invention has been described in detail and with reference to specific embodiments thereof, it will be apparent to one skilled in the art that various changes and modifications can be made therein without departing from the spirit and scope thereof.

What is claimed is:

1. A conductive polymer composition exhibiting positive temperature coefficient behavior and an improved breakdown voltage property, comprising:
   (a) a crystalline polymer having a crystallinity of about 10 to 98 percent and having dispersed therein
   (b) carbon black having an average particle diameter of from about 80 to 110 millimicrons and a DBP absorption of from about 110 to 140 cc/100 g,
wherein said composition comprises 100 parts by weight of said crystalline polymer and 40 to 150 parts by weight of said carbon black.

2. The conductive polymer composition as claimed in claim 1, wherein said crystalline polymer has a crystallinity of at least about 20 percent.

3. The conductive polymer composition as claimed in claim 1, wherein said crystalline polymer has a crystallinity of about 20 to 40 percent.

4. The conductive polymer composition as claimed in claim 1, wherein said crystalline polymer comprises a polyolefin comprising at least one α-olefin.

5. The conductive polymer composition as claimed in claim 4, wherein said crystalline polymer is selected from the group consisting of polyethylene, polypropylene and a copolymer of ethylene and propylene.

6. The conductive polymer composition as claimed in claim 5, wherein said crystalline polymer is modified to contain at least one maleic acid, epoxy or isocyanate group.

7. The conductive polymer composition as claimed in claim 4, wherein said crystalline polymer comprises a copolymer of an α-olefin and at least one polar comonomer.

8. The conductive polymer composition as claimed in claim 7, wherein said polar comonomer is selected from the group consisting of vinyl acetate, acrylic acid, an acrylic acid salt, methacrylic acid, a methacrylic acid salt, ethyl acrylic acid, an ethyl acrylic acid salt, ethyl acrylate, and methacrylate.

9. The conductive polymer composition as claimed in claim 8, wherein said crystalline polymer is modified to contain at least one maleic acid, epoxy, or isocyanate group.

10. The conductive polymer composition as claimed in claim 1, wherein said crystalline polymer comprises a polyester.

11. The conductive polymer composition as claimed in claim 10, wherein said polyester is selected from polybutylene terephthalate, polyethylene terephthalate, and polycaprolactone.

12. The conductive polymer composition as claimed in claim 1, wherein said crystalline polymer comprises at least one of a polyarylene, a polyamide, and a polycarbonate.

13. The conductive polymer composition as claimed in claim 1, wherein said crystalline polymer comprises a fluorocarbon polymer.

14. The conductive polymer composition as claimed in claim 13, wherein said fluorocarbon polymer is selected from the group consisting of polyvinylidene fluoride, polytetrafluoroethylene, a fluorinated copolymer of ethylene and propylene, and a copolymer of ethylene and a comonomer containing fluorine.

15. The conductive polymer composition as claimed in claim 4, wherein said crystalline polymer comprises a copolymer of ethylene and at least one copolymerizable monomer comprising an ester group or a carboxyl group.

16. The conductive polymer composition as claimed in claim 15, wherein said copolymer comprises at least one epoxy group or isocyanate group.

17. The conductive polymer composition as claimed in claim 8, wherein said crystalline polymer is a copolymer of ethylene and at least one copolymerizable monomer selected from the group consisting of acrylic acid, vinyl acetate, and methacrylic acid.

18. The conductive polymer composition as claimed in claim 17, wherein said copolymer comprises from about 80 to less than 100 percent of ethylene and from more than 0 to about 25% of said copolymerizable monomer.

19. The conductive polymer composition as claimed in claim 5, wherein said crystalline polymer is polyethylene.

20. The conductive polymer composition as claimed in claim 19, wherein said crystalline polymer is high density polyethylene.

21. The conductive polymer composition as claimed in claim 7, wherein said crystalline polymer is an ionomeric copolymer comprising ethylene, methacrylic acid and a methacrylic acid salt.

22. The conductive polymer composition as claimed in claim 7, wherein said crystalline polymer is a terpolymer of ethylene, vinyl acetate and glycidyl methacrylate.

23. The conductive polymer composition as claimed in claim 7, comprising 100 parts by weight of said crystalline polymer and from about 50 to 150 parts by weight of said carbon black.

24. The conductive polymer composition as claimed in claim 1, comprising 100 parts by weight of said crystalline polymer and from about 50 to 120 parts by weight of said carbon black.

25. The conductive polymer composition as claimed in claim 19, comprising 100 parts by weight of said crystalline polymer and from about 40 to 120 parts by weight of said carbon black.

26. The conductive polymer composition as claimed in claim 20, comprising 100 parts by weight of said crystalline polymer and from about 50 to 110 parts by weight of said carbon black.

27. The conductive polymer composition as claimed in claim 26, comprising 100 parts by weight of said crystalline polymer and from about 65 to 85 parts by weight of said carbon black.

28. The conductive polymer composition as claimed in claim 21, comprising 100 parts by weight of said crystalline polymer and from about 60 to 120 parts by weight of said carbon black.

29. The conductive polymer composition as claimed in claim 28, comprising 100 parts by weight of said crystalline polymer and from about 70 to 100 parts by weight of said carbon black.

30. The conductive polymer composition as claimed in claim 22, comprising 1200 parts by weight of said crystalline polymer and from about 60 to 120 parts by weight of said carbon black.

31. The conductive polymer composition as claimed in claim 30, comprising 100 parts by weight of said crystalline polymer and from about 70 to 100 parts by weight of said carbon black.

32. The conductive polymer composition as claimed in claim 1, wherein said composition has a volume resistivity of at most about 100 $\Omega$-cm at a temperature between $-40°$ C. and a switching temperature $T_s$ of said composition.

33. The conductive polymer composition as claimed in claim 32, wherein said composition has a volume resistivity of at most about 50 $\Omega$-cm at a temperature between $-40°$ C. and a switching temperature $T_s$ of said composition.

34. The conductive polymer composition as claimed in claim 33, wherein said composition has a volume resistivity of at most about 20 $\Omega$-cm at a temperature between $-40°$ C. and a switching temperature $T_s$ of said composition.

35. The conductive polymer composition as claimed in claim 34, wherein said composition has a volume resistivity of at most about 10 $\Omega$-cm at a temperature between $-40°$ C. and a switching temperature $T_s$ of said composition.

36. The conductive polymer composition as claimed in claim 32, wherein said composition has a peak resistivity of at least about 1000 $\Omega$·cm.

37. The conductive polymer composition as claimed in claim 36, wherein said composition has a peak resistivity of at least about 5000 $\Omega$·cm.

38. The conductive polymer composition as claimed in claim 37, wherein said composition has a peak resistivity of at least about 10,000 $\Omega$·cm.

39. The conductive polymer composition as claimed in claim 38, wherein said composition has a peak resistivity of at least about 50,000 $\Omega$·cm.

40. The conductive polymer composition as claimed in claim 1, wherein the volume ratio of said carbon black to said crystalline polymer is from 0.15 to 0.65.

41. The conductive polymer composition as claimed in claim 1, wherein the specific surface area S of said carbon black in m$^2$/g and the average particle diameter D of said carbon black are such that S/D is at most about 10.

42. The conductive polymer composition as claimed in claim 41, wherein the quantity $$\frac{S}{D} \times \frac{\text{volume of carbon black}}{\text{volume of polymer component}}$$

is at most about 1.0.

43. The conductive polymer composition as claimed in claim 1, having a switching temperature $T_s$ of at most about 180° C.

44. The conductive polymer composition as claimed in claim 43, having a switching temperature $T_s$ of at most about 130° C.

45. The conductive polymer composition as claimed in claim 44, having a switching temperature $T_s$ of at most about 100° C.

46. The conductive polymer composition as claimed in claim 1, wherein said crystalline polymer is crosslinkable.

* * * * *